E. KNOWLTON.
PEANUT PLANTER.
APPLICATION FILED JUNE 19, 1912.
1,061,384.
Patented May 13, 1913.
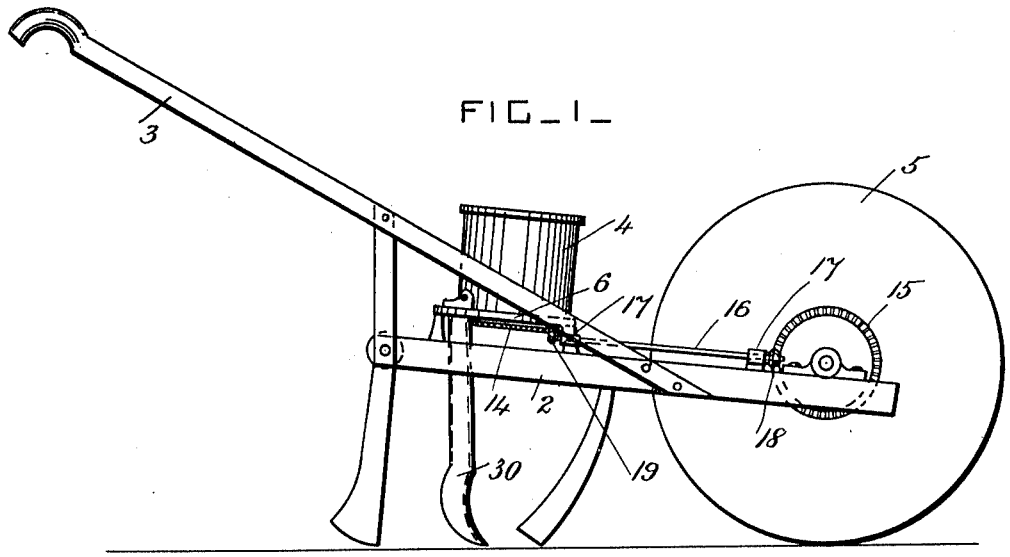
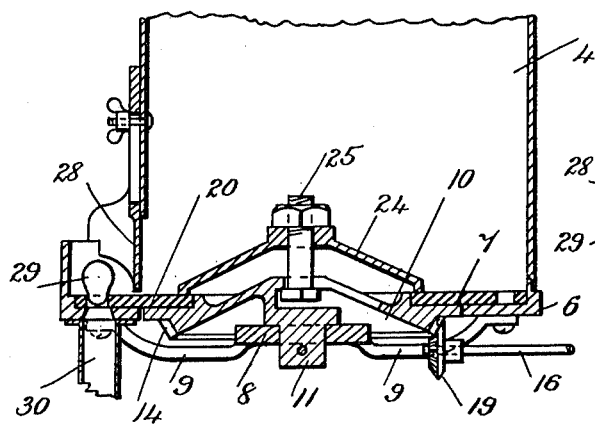
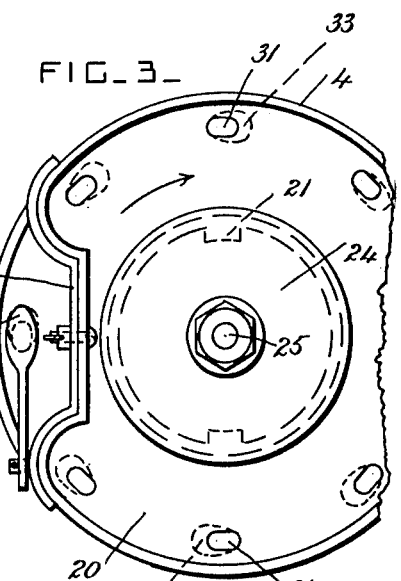
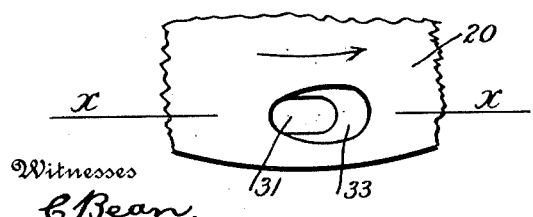
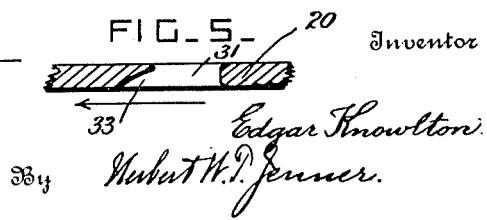
Witnesses
C. Bean.
J. M. N. Bates.
Inventor
Edgar Knowlton.
By Hubert W. P. Jenner.
Attorney

UNITED STATES PATENT OFFICE.

EDGAR KNOWLTON, OF PIDCOCK, GEORGIA.

PEANUT-PLANTER.

1,061,384.

Specification of Letters Patent.   Patented May 13, 1913.

Application filed June 19, 1912.   Serial No. 704,554.

*To all whom it may concern:*

Be it known that I, EDGAR KNOWLTON, a citizen of the United States, residing at Pidcock, in the county of Brooks and State of Georgia, have invented certain new and useful Improvements in Peanut-Planters; and I do hereby declare the following to be a full, clear, and exact description of the invention, such as will enable others skilled in the art to which it appertains to make and use the same.

This invention relates to a machine for planting pea-nuts; and it consists in the novel construction of the feed disk as hereinafter fully described and claimed in combination with means for operating it.

In the drawings, Figure 1 is a side view of a planter constructed according to this invention. Fig. 2 is a vertical section through the seedbox. Fig. 3 is a plan view of the seedbox. Fig. 4 is a plan view of a portion of the feed disk, looking from below. Fig. 5 is a section taken on the line x—x in Fig. 4.

The planter is provided with a frame 2, handles 3, seedbox 4, and a ground wheel 5, similar to those used on corn-planters of approved construction. The seedbox has a bottom plate 6 having a circular hole 7; and 8 is a hub arranged below the plate 6 concentric with the hole 7 and connected to the plate 6 by arms 9. A carrier disk 10 is journaled in the hole 7 and has a stem 11 which is journaled in and supported by the hub 8. The carrier disk 10 is provided with a beveled toothed ring 14, and the ground wheel 5 has a beveled toothed wheel 15 secured to one side of it. A shaft 16 is journaled in bearings 17 on the frame and has a beveled toothed pinion 18 on one end portion of it which gears into the wheel 15. A beveled toothed pinion 19 is secured on the other end portion of the shaft 16 and gears into the ring or wheel 14. Any other approved driving devices may however be used for revolving the carrier plate.

The feed disk 20 is removable, and it is provided with lugs 21 for engaging with notches in a flange 22 on the carrier disk over which it is slipped. The feed disk 20 rests on the bottom plate 6 inside the seedbox and on the carrier disk. A conical cover plate 24 is secured over the central opening of the feed disk by means of a bolt 25 which projects from the carrier disk. A vertically adjustable shield or gate 28 is provided at one side of the seedbox, and 29 is a discharger which is pivoted to the said gate, and which consists of a weighted arm having its head arranged over the discharge spout 30. The feed disk 20 is provided with a series of oval holes 31 of a suitable size and shape to receive the pea-nuts, and it is revolved in the direction of the arrow in Fig. 4. The rear end of each hole 31 is vertical, and its top edges are rounded. Each hole 31 has a conical or spoon-shaped cavity or enlargement 33, formed in the underside of the disk and extending along the sides of the hole and projecting beyond its front or foremost end for about one half the length of the hole as measured at its entrance at the top of the plate. This cavity 33 at the front end of the oval hole enables the feed disk to be used successfully in planting peanuts, and without this cavity the pea-nuts are not discharged properly. The pea-nuts are placed in the seedbox and enter the holes in the feed disk. When a pea-nut has been moved under the shield or gate 28, it drops by gravity down the spout 30, and its dropping is assisted by the discharger 29 if necessary.

What I claim is:

In a pea-nut planter, the combination, with a seedbox, of a feed disk journaled at the bottom of the seedbox and provided with a series of holes for receiving the peanuts, each hole being oval at the top of the plate and having a vertical rear end, the lower part of each hole having a concave spoon-shaped enlargement of greater width and length than the top part of the hole and extending along its sides and projecting beyond its front end only, the front end of the bottom of the enlargement being of greater radius than the front end of the top of the hole, and driving devices for revolving the feed disk.

In testimony whereof I have affixed my signature in the presence of two witnesses.

EDGAR KNOWLTON.

Witnesses:
P. P. COOPER,
R. P. OESTENEICHER.